United States Patent
Wing et al.

(10) Patent No.: US 7,447,751 B2
(45) Date of Patent: Nov. 4, 2008

(54) METHOD FOR DEPLOYING A VIRTUAL PRIVATE NETWORK

(75) Inventors: Julie Wing, Cupertino, CA (US); Rob Shomo, San Jose, CA (US); David Graves, Monte Sereno, CA (US); Sajeev Madhavan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 825 days.

(21) Appl. No.: 10/360,880

(22) Filed: Feb. 6, 2003

(65) Prior Publication Data

US 2004/0158601 A1      Aug. 12, 2004

(51) Int. Cl.
*G06F 15/177*      (2006.01)

(52) U.S. Cl. ................ 709/220; 709/223; 709/225; 709/200; 713/153

(58) Field of Classification Search ........... 709/200, 709/220, 225, 223; 713/153
See application file for complete search history.

(56) References Cited

U.S. PATENT DOCUMENTS

| | | | |
|---|---|---|---|
| 6,079,020 A * | 6/2000 | Liu | 726/15 |
| 6,438,127 B1 | 8/2002 | Le Goff et al. | 370/389 |
| 6,754,831 B2 * | 6/2004 | Brownell | 726/15 |
| 7,013,342 B2 * | 3/2006 | Riddle | 709/230 |
| 2002/0161863 A1 * | 10/2002 | McGuire | 709/220 |
| 2003/0018820 A1 | 1/2003 | Ould-Brahim et al. | 709/249 |
| 2003/0084342 A1 * | 5/2003 | Girard | 713/201 |
| 2003/0140223 A1 * | 7/2003 | Desideri | 713/153 |
| 2003/0154279 A1 * | 8/2003 | Aziz | 709/225 |
| 2003/0177221 A1 * | 9/2003 | Ould-Brahim et al. | 709/223 |
| 2004/0049597 A1 | 3/2004 | Ould-Brahim | 709/242 |

FOREIGN PATENT DOCUMENTS

WO      WO03/079614      9/2003

* cited by examiner

*Primary Examiner*—Tonia L Dollinger
*Assistant Examiner*—Kyung H Shin (57) ABSTRACT

A system for automatically deploying a VPN device comprises a resource abstraction layer coupled to the VPN device, for providing the device with a configuration specific to it, and a uniform interface coupled to the RAL, for providing the VPN device with a configuration that is not specific to the device.

30 Claims, 8 Drawing Sheets

METHOD FOR DEPLOYING A VIRTUAL PRIVATE NETWORK

FIELD OF THE INVENTION

Embodiments of the present invention relate to the field of virtual private networks. Specifically, embodiments of the present invention relate to a method and system for automatically deploying virtual private networks.

BACKGROUND OF THE INVENTION

Modern network computing allows great benefits by sharing information and computing resources. As an example, information is transmitted within networks between server computers and client computers in response to requests by the client computer's application. Networks have become widely used resources for information transfer.

Public networks such as the Internet have progressed and proliferated markedly in the recent past. This progression and proliferation allows public networks to offer the advantages of substantial resources, including a well developed physical infrastructure, widely used protocols, and established, experienced management.

Despite their near ubiquity and substantial advantages, public networks in recent times have proven somewhat vulnerable to security problems, such as hacker intrusions, prying, spying, and outright attacks, as well as the propagation of harmful viruses, nukes, worms, Trojan horses, and the like. Almost all public network users share exposure and varying degrees of risk to such problems.

Private networks have also developed. Private networks offer some advantages such as a higher degree of security than possible on public networks. For this reason among others, some network users have found private networks preferable to public ones in some circumstances and/or for particular networking applications.

Private networks however often lack the infrastructure and other resources and thus sometimes lack the substantial capacities and capabilities of public networks. The more recent development of the Virtual Private Network (VPN) overcame this private network paucity. Accordingly, the VPN has attracted the attention of users seeking the advantages of private networking.

A VPN utilizes a public network such as the Internet as a backbone for a private interconnection between computing locations for information transfer. A VPN appears to its users to be a private network. However, transfer of information between users of a VPN takes place over the same backbone trunks and other resources of the public network used by others.

A VPN uses access control and encryption technologies to achieve the security inherent in private networks while taking advantage of the infrastructure, economies of scale, and established management resources of public networks. The VPN establishes in effect a secure 'tunnel' for the transfer of information between the authorized users.

Information transferred between the users is encrypted, and the VPN is firewalled. Access is restricted to authorized users, who must provide a valid password. Some users employ a Utility Data Center (UDC) to provision network resources, such as, but not limited to servers, firewalls, and VPN devices, called in some circles a 'farm', for the clients of a single user or set of users.

Provisioning entails assigning resources to a farm, such as but not limited to servers, firewalls, and VPN devices. Essentially, the farm is a collection of these resources, which can be can be wide ranging. The farm is connected to the network, which itself is unprotected, relative to the farm. But the VPN secures point-to-point communication with the farm, because the farm is configured across the secure tunnel through the network accorded by the VPN.

A VPN is a configurable device to allow flexibility in defining authorized users, how the tunnel is set up, and other aspects. While VPN vendors typically implement the tunnel and other network aspects using a particular protocol, such as Internet Protocol (IP), they do so in unique specific ways. 'Defaults' may vary for instance, among other things.

Provisioning the farm conventionally involves intensive manual programming individual device settings to configure a tunnel to facilitate a VPN connection from a remote data center (e.g., a client) to the utility data center. Thus when a user requests a VPN in their farm, its configuration must be manually configured.

The tunnels must be manually established for the user to connect securely to their farm on a first connection. For instance, a network administrator must conventionally allocate a device by actual access and setting. While networking information may be available from software, device configurations must basically be made individually and manually. The requirement for manually configuring a VPN can be problematic for several reasons.

In racks of servers functioning as VPNs for instance a user's request can require the allocation of a number of the servers; 10 for example. All ten must be manually configured, every single one; a not always simple, quick, and easy task. This need for manual configuring can be problematic, because it can be tedious as well as laborious and error-prone, which can combine to make it somewhat expensive.

Beside configuring device settings, in some operating data centers, a customer request for a VPN and related resources such as servers can actually require significant labor and material resources. For instance, configuring some such installations, a rack for instance, to perform a particular function can require a technician to physically move servers and other resources and physically custom wire the required cabling.

Further, security aspects can pose an issue with manual configuration. For instance, initially, the configuring administrator is privy to information sensitive to the user's network security, such as private Internet Protocol (IP) addresses and a password. Ideally, after a first pass, a user should privately change such security sensitive information. However, lapses occur and sometimes this security measure does not take place. The administrator may thus retain know-how for gaining unwelcome further access to the farm.

SUMMARY OF THE INVENTION

A system for automatically deploying a Virtual Private Network (VPN) device comprises a resource abstraction layer (RAL) coupled to the VPN device, for providing the device with a configuration specific to it, and a uniform interface coupled to the RAL, for providing the VPN device with a configuration that is not specific to the device.

DETAILED DESCRIPTION OF THE INVENTION

A method and system for automatically deploying a virtual private network is disclosed.

Notation and Nomenclature

Figure 1:
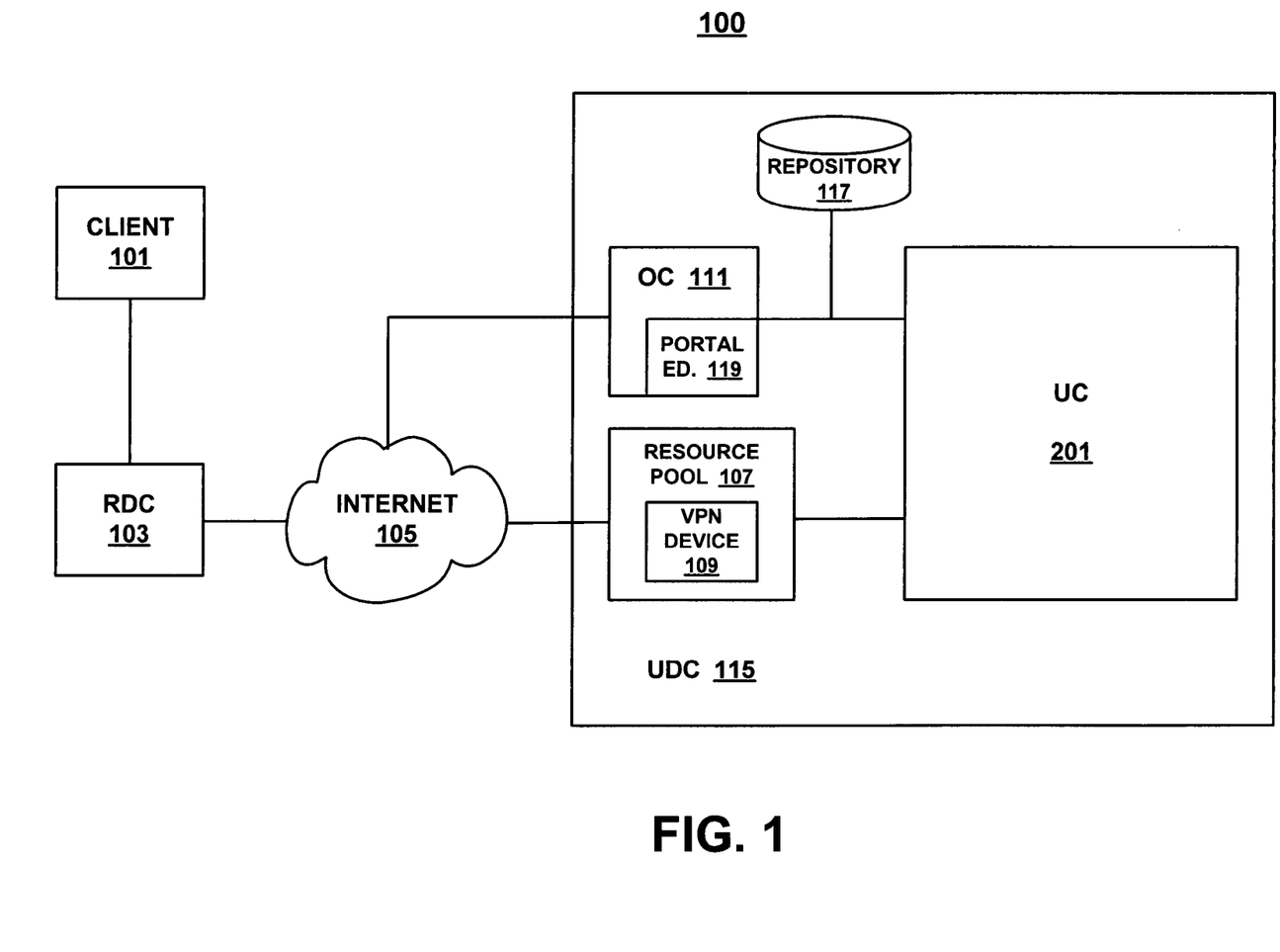
FIG. 1 depicts a utility data center in a network environment, according to one embodiment of the present invention.

An embodiment of the present invention is deployed within a network environment (e.g., network environment 100; FIG. 1) comprising a data center, a network, and a client computer (e.g., data center 115, Internet 105, client computer 101; FIG. 1). The network of this environment can be any kind of network with publicly accessible components, such as a wide area network (WAN) or the Internet. To illustrate the operation of one embodiment of the present invention to deploy a Virtual Private Network (VPN) within a public networking milieu, the Internet will be discussed as the network involved.

Figure 2:
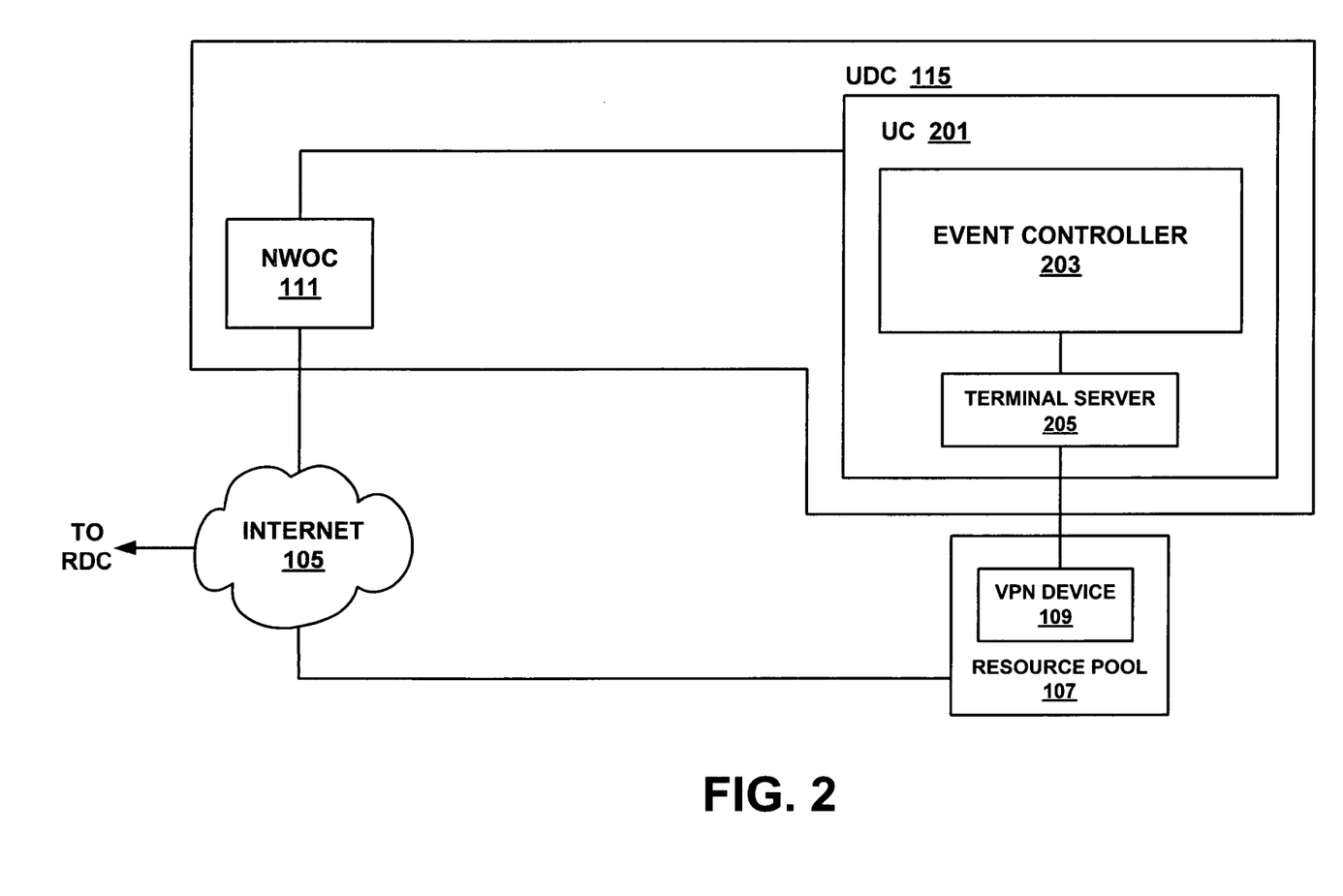
FIG. 2 depicts an event controller and its connections to a portion of a network environment, according to one embodiment of the present invention.
Figure 3:
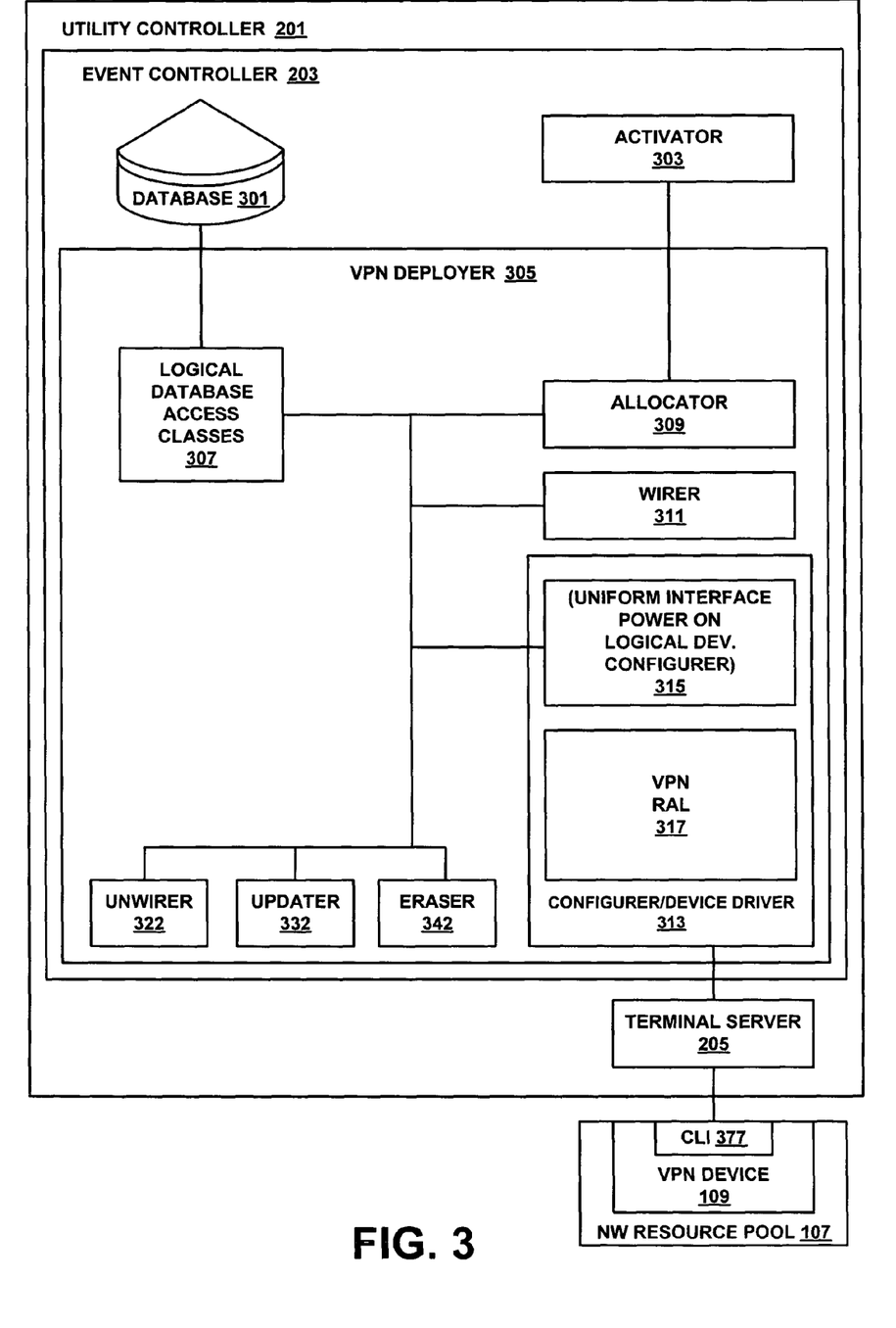
FIG. 3 depicts a utility controller, according to one embodiment of the present invention.

A computer system that embodies a portion of a system for automatically deploying virtual private networks can be any kind of computer system. For example, the computer system can be a workstation computer system, a personal computer system, a main-frame computer system, or a supercomputer system. In one embodiment, the computer system is a computer comprising a utility controller (e.g., utility controller 201; FIGS. 2, 3). Modules comprising the system for automatically deploying virtual private networks can be deployed in software, firmware, and/or hardware or any combination of software, firmware, and/or hardware.

Figure 6:
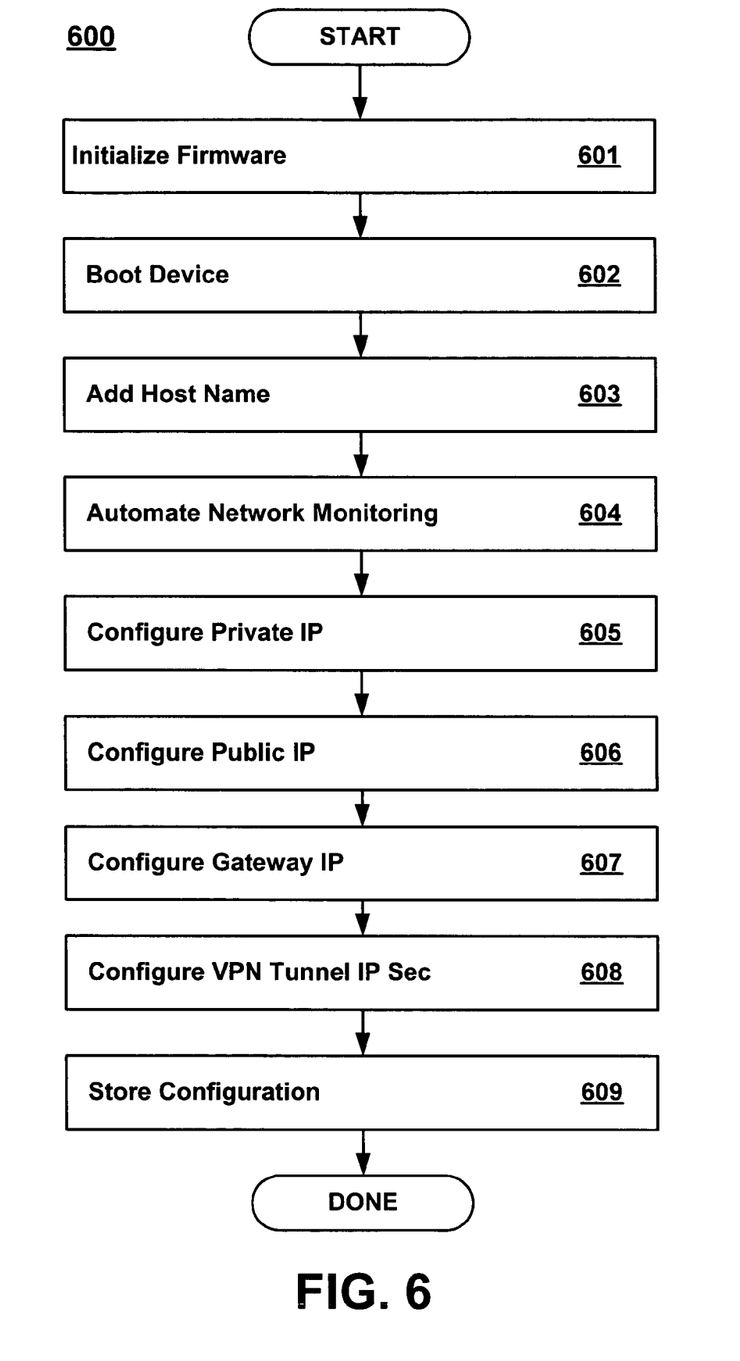
FIG. 6 is a flowchart of the steps in a process for configuring a VPN device, according to an embodiment of the present invention.
Figure 7:
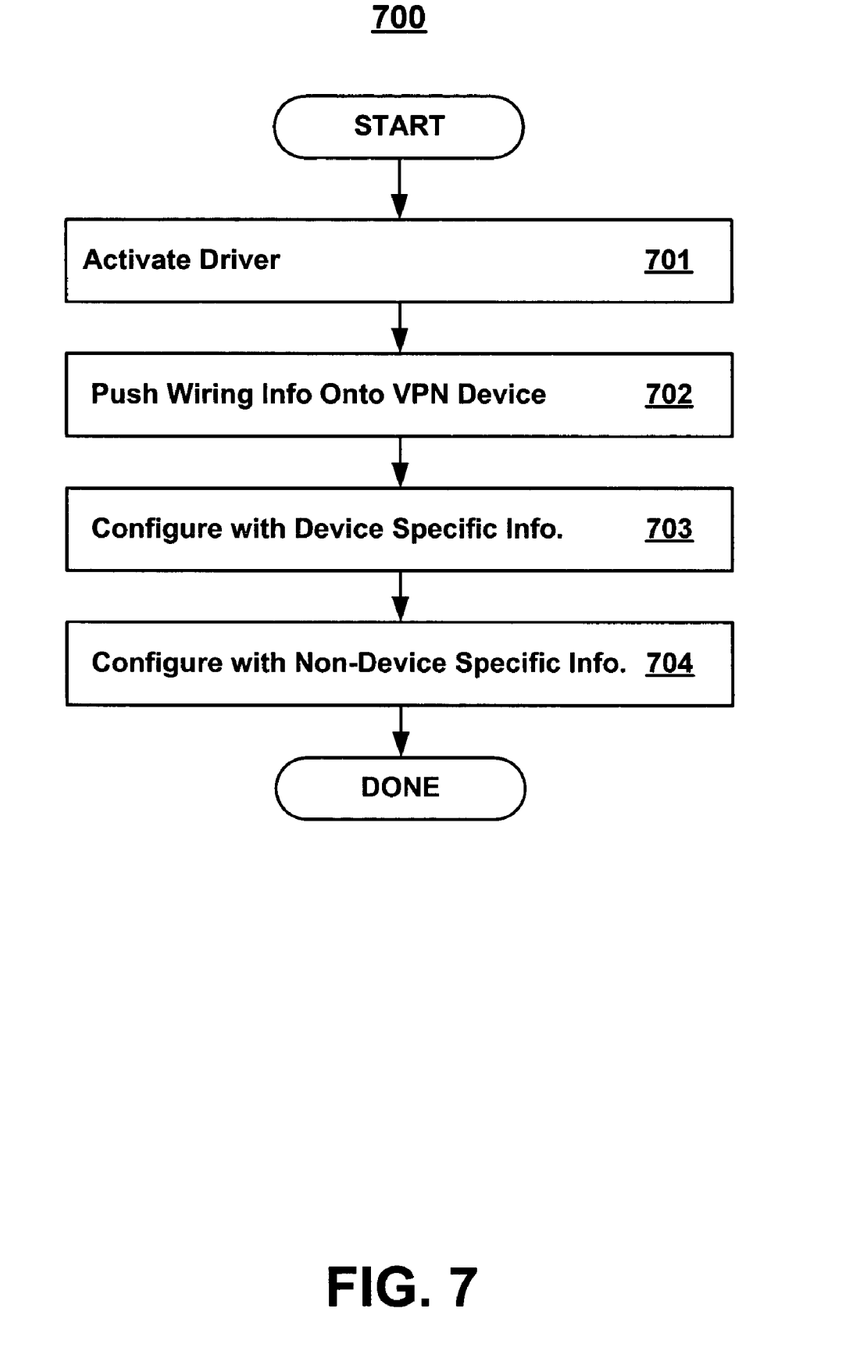
FIG. 7 is a flowchart of the steps in a process for automatically configuring a VPN device, according to an embodiment of the present invention.
Figure 8:
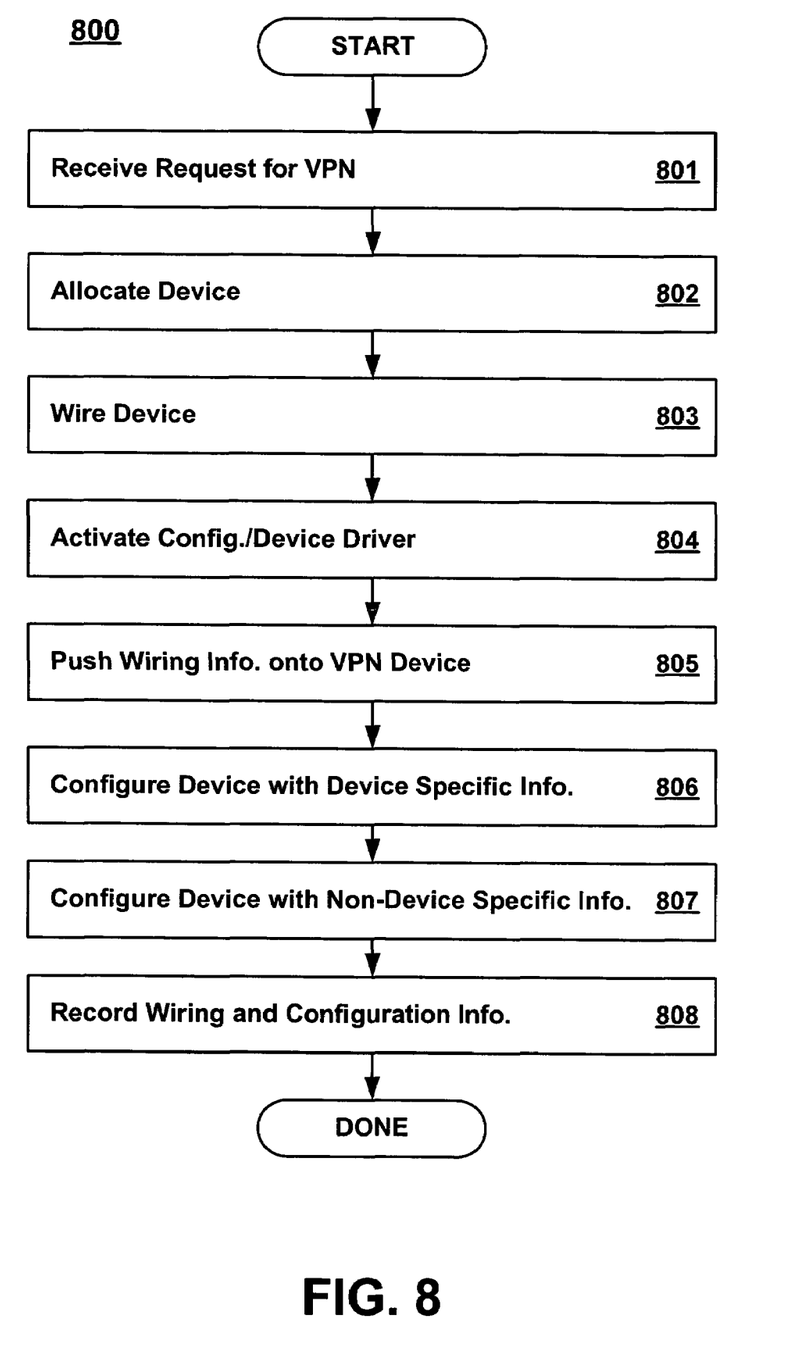
FIG. 8 is a flowchart of the steps in a process for automatically provisioning a farm, according to an embodiment of the present invention.

Portions of the detailed descriptions of embodiments of the invention that follow are presented in terms of processes (e.g., Processes 600, 700, 800; FIGS. 6, 7, 8, respectively). Although specific steps are disclosed in figures herein describing the operations of these processes, such steps are exemplary. That is, embodiments of the present invention are well suited to performing various other steps or variations of the steps recited in the flowcharts herein.

In one embodiment, such processes are carried out by processors and electrical/electronic components under the control of computer-readable and computer-executable instructions. The computer-readable and computer-executable instructions reside, for example, in data storage features, memory, registers and other components of a computer system such as a utility controller computer (e.g., utility controller 201; FIGS. 2, 3). However, the computer readable and computer executable instructions may reside in any type of computer readable medium.

One embodiment of the present invention effectuates the automatic deployment of a VPN. In one embodiment, a VPN resource abstraction layer (RAL) is based upon a utility computing infrastructure, where related hardware is wired once. A controlling software layer receives requests for VPN resources and communicates with the physical VPN device to make configuration changes thereto. This enables a VPN to be dynamically provisioned (or e.g., de-provisioned) by configuring computing resources into a dynamic data center, known as a 'farm'.

VPN power is connected to an automated power controller port. Network connections are programmed into switches and define attributes of a VPN, which can be stored in a repository of the utility computing infrastructure. The VPN RAL in one embodiment is an Application Program Interface (API) that abstracts this information, connects to a serial console of the VPN device, and sends device-specific commands thereto to configure the VPN.

A uniform interface defines a standard GUI, event navigation classes, and a database structure to represent the VPN. A configuration is defined to facilitate these standard structures, comprising basic requirements to provision a secure remote access connection with the IPSec protocol using an Internet Key Exchange.

Event classes provide allocation, wiring, and other capabilities. These event classes are not device specific. Advantageously, development efforts exerted to add subsequent hardware models as devices can focus on the creation of a new RAL driver. Thus, existing GUI and screen resources, database, and event class structure of the event architecture can be re-used.

The driver layer class extracts data needed by the VPN RAL. Such RAL needed data can include accessing device attributes from a repository, powering on the device, and connecting to its Command Line Interface (CLI) console. The RAL communicates with the device via a serial interface and at the CLI makes device-specific configuration changes.

Thus, a device driver for automated provisioning creates a repeatable and scaleable configuration process for a specific VPN type, which can significantly reduce human error by eliminating a number of tedious steps that were conventionally required. An embodiment of the present invention enables racks of VPN devices to be provisioned using the same automated configuration steps, saving time, effort, and money and reducing the possibility of error.

Initial connection to a dynamically provisioned data center, configured according to an embodiment of the present invention, provides heightened security. The heightened security accrues to the fact that no unauthenticated personnel need access VPN information to set the VPN up manually, as they do conventionally. Further, the protocol used in one embodiment secures the VPN connection at a network level; all protocols and ports are forwarded. Thus, the VPN is transparent to applications, and there is a reduced risk of inadvertently transmitting unencrypted data.

An embodiment of the present invention provides automated VPN provisioning. This provides inherent scalability, and reduces VPN ownership costs, relative to conventional implementations. Scalability accrues to the fact that numerous racks can be deployed as a VPN automatically through provisioning software and a VPN driver.

Less human intervention is required, dependency on proprietary tools of varying kinds and the technical know-how to use them is reduced. This reduces costs associated with VPN provisioning, because a lower cost of manual set-up is expended for each VPN provisioned, costs associated with human errors made during conventional set-up are significantly reduced, and implementation costs drop as racks are provisioned faster automatically (e.g., at computer speeds).

Further, scalability is enhanced because VPN configurations associated with one embodiment of the present invention are based on feature sets common to all VPN devices, allowing re-use of features. Also, one embodiment stores VPN configuration information in an accessible repository, which provides a convenient mechanism to automatically restore a failed VPN to the latest configuration, or dynamically configure a new VPN to replace a failed one.

Exemplary System

Embodiments of the present invention are discussed primarily in the context of a method and system for automatically deploying a VPN. With reference to FIG. 1, a network environment 100 upon which an embodiment of the present invention can be deployed is described.

A VPN can be deployed within network environment 100 into a dynamically provisioned data center within a utility computing infrastructure (e.g., utility data center) 115. Provisioning (e.g., deployment) comprises allocating device 109 as a VPN device, powering, wiring, and configuring for VPN usage within the dynamically provisioned data center.

VPNs provide a secure network tunnel for transfer of encrypted data between authenticated (e.g., authorized) systems over a relatively unprotected public network backbone. In this context, the VPN is a dedicated hardware appliance (e.g., device) 109 that provides a secure connection to resources within a dynamically provisioned data center.

Network environment 100 comprises a client computer 101 from which a user can request the provisioning of a VPN. The request is transmitted in one embodiment through a remote data center (RDC) 103, via a network 105, to a network operations center (OC) 111. A repository database 117 is accessible from OC 111 and serves as a repository of network information, such as VPN configurations. In another embodiment, client computer 101 can transmit the request directly through network 105.

FIG. 1 depicts network 105 as the Internet. However, other networks can also be used. Through network 105, OC 111 receives the request to provision a VPN, which is then passed on to a utility data center (UDC) 115. UDC 115 comprises a utility controller 201, OC 111, and resource pool 107.

OC 111 comprises a portal editor 119, which provides a user with the ability to draw (e.g., specify) how they want the farm being requested, to be connected. For instance, portal editor 119 can be used to specify connection of specific VPN devices to a particular subnet, and connected to the Internet. A user can access the portal editor via a web server using HTTP commands.

Within UDC 115, the provisioning request is handled and effectuated automatically. To provision the VPN, a corresponding VPN device 109, which exists within a network resource pool 107, is automatically configured as necessary to provision a VPN from the resource pool.

FIG. 2 illustrates that UDC 115 is comprised of a utility controller 201. Utility controller 201 functions as a state engine and features an event controller 203, from which the automated VPN deployment is controlled by configuration commands for the device 109 comprising the VPN. Configuration commands for VPN device 109 are transferred from event controller to the VPN device within network resource pool 107 via terminal server 205. Terminal server 205 is a component of utility controller 201 as well.

Event controller 203 is comprised of several modules involved in the automatic deployment of a VPN, according to an embodiment of the present invention. Referring to FIG. 3, a component module of event controller 203 provides a software interface to send commands specific to VPN device 109 and necessary for the deployment of the VPN to the device.

Event controller 203 has a database 301 and an activator module 303, coupled to a VPN deployment module 305. Database 307 is coupled to logical database access classes 307, within VPN deployment module 305. Activator 303 is coupled to allocator 309, also within VPN deployer 305.

Within VPN deployer 305, logical database access classes 307 are also coupled to allocator 309. Logical database access classes 307 are also coupled therein to a wirer 311 and to a configurer (e.g., a device driver) 313. Specifically, the logical database access classes 307 are coupled to a uniform interface (e.g., power on/logical device configurer) 315, which comprises a part of device driver 313.

Also comprising device driver 313 is a VPN resource abstraction layer (RAL) 317. RAL 317 generates configuration commands specific to VPN device 109. These commands are transmitted from device driver 313 to VPN device 109 via terminal server 205.

Device-specific commands for VPN device 109 are generated by RAL 317. In one embodiment, the device-specific commands are promulgated to the command line interface (CLI) 377 of VPN device 109. In another embodiment, these commands are made to the device's Application Program Interface (API).

Such commands have functions including, but not limited to, initializing firmware, booting, adding a host name, automating VPN device network monitoring, configuring the network interfaces on the VPN private Internet Protocol (IP), configuring the network interfaces on the VPN public IP, configuring the network interfaces on the Internet (or other network) gateway router IP, configuring the secure, private VPN tunnel through the public networking backbone, and storing copies of the VPN configuration in a repository within the utility computing infrastructure, such as database 117 (FIG. 1). In one embodiment, the tunnel comprises a remote client tunnel characterized by a Secure Internet Protocol (IPSec) configuration.

The functionality of RAL 317 to automatically configure device 109 so as to deploy a VPN is executed in response to a request to create a dedicated farm, received by UC 201. Such a request can comprise submission of a farm specification from a portal editor to utility controller 201. Receiving such a request, UC 201 has event controller 203 trigger activator 303 to initiate the function of automated VPN deployer 305.

Event controller 203 features, in one embodiment, an unwirer 322 for placing a VPN in an inaccessible but available standby mode. Event controller 203 also features, in one embodiment, an updater 332 for updating VPN device information. Further, in one embodiment, event controller 203 features an eraser 342, for de-configuring a VPN for termination.

Figure 4:
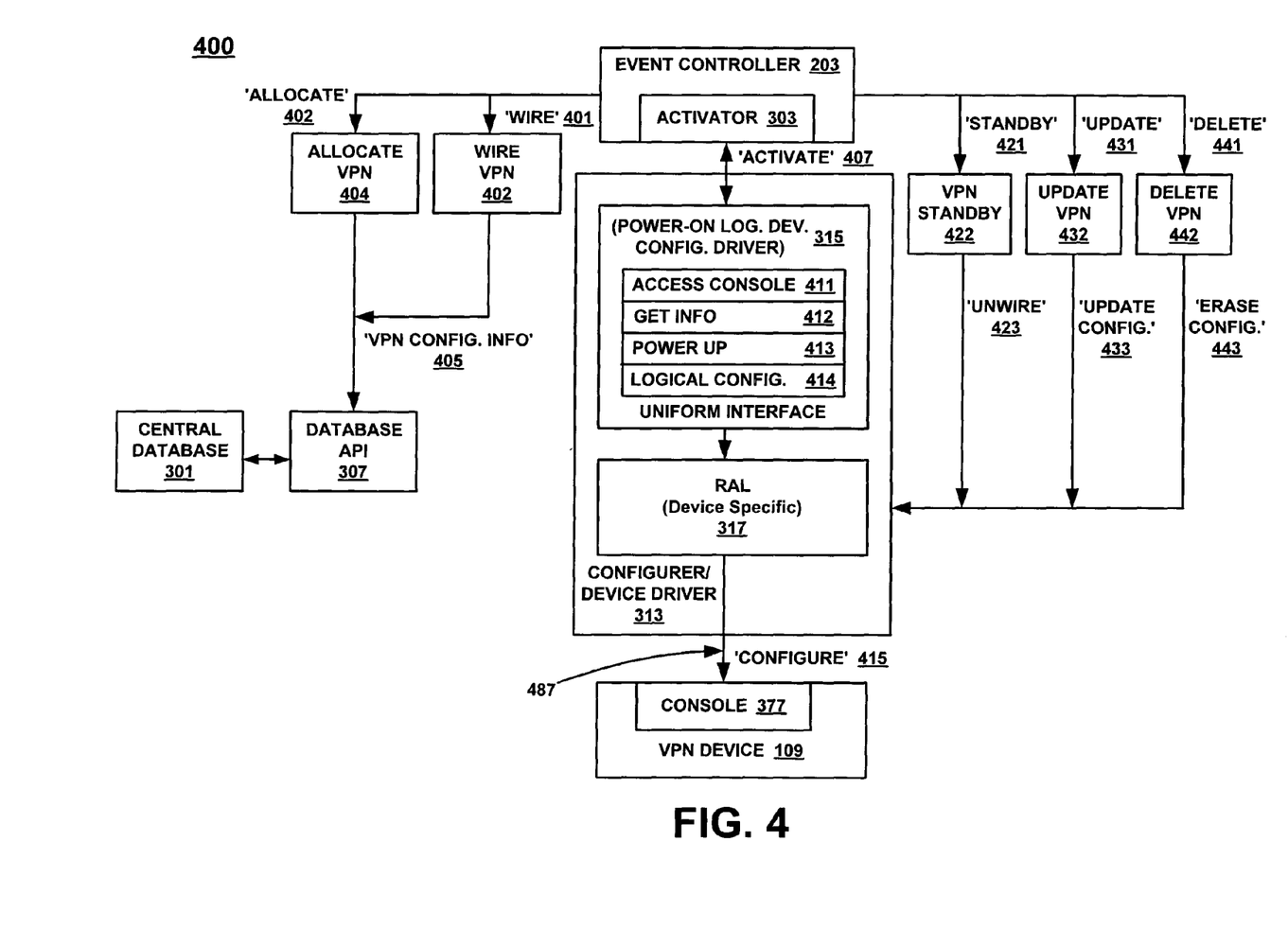
FIG. 4 depicts data flow between an event controller and a VPN device, according to one embodiment of the present invention.

Referring to FIG. 4, the flow associated with an event architecture and command structure 400 for the automated and other deployment activities is described. Upon activation by event controller 203, an 'allocate' function 402 is called. The 'allocate VPN' functionality 404 contacts central database 301, via the database API 307. From the central database 301, 'allocate VPN' 404 determines all VPN devices associated with the network and allocates a free VPN device 109 of an appropriate type.

Upon allocation of a free VPN device 109, a 'wire' function 401 is called. A 'wire VPN' functionality 402 creates (e.g., specifies) the wiring the allocated device 109 requires for inclusion in the network. A VPN is wired into network switches and/or routers.

For instance, an appropriate subnet may be chosen to create the wiring for the VPN. Corresponding wiring information is sought from database 301. Appropriate ports on the switches assigned to the VPN are programmed and the subnets are created to correspond with this information.

An 'activate' function 407 is called by activator 303. In response to calling the 'activate' function 407, configurer/device driver 313 will attempt to establish a serial connection to the console 487 of the VPN device 109. Further, wiring information previously generated and retrieved from database 301 will be provided to device 109 as well.

For updating the VPN, the 'get info' functionality 412 contacts the database 301 and extracts the needed information. The 'power-up' functionality 413 powers up device 109, and the 'logical configuration' functionality 414 implements the requested configuration for VPN device 109. This includes specific device commands, unique to the CLI of device 109 and stored in database 301.

Information relating to its designated subnet is then pushed onto VPN device 109. For instance, the private interface of the VPN is configured with an IP address and mask, its public interface is configured, and a user is added to configure an IPSec tunnel.

Power on/logical device configuration driver (e.g., uniform interface) 315 will program device 109 with general (e.g., non-device specific) information. This information can include code common to any type of compatible VPN. In contrast, RAL 317 provides device 109 with device-specific information through the CLI of the device. The 'access console' functionality 411 establishes the serial connection with the console 377, which effectuates the CLI, through the terminal server 205 (FIGS. 2, 3). RAL 317 thus effectively serves as an interpreter for the CLI of device 109. In an alternative embodiment, an API can perform an analogous function.

Figure 5:
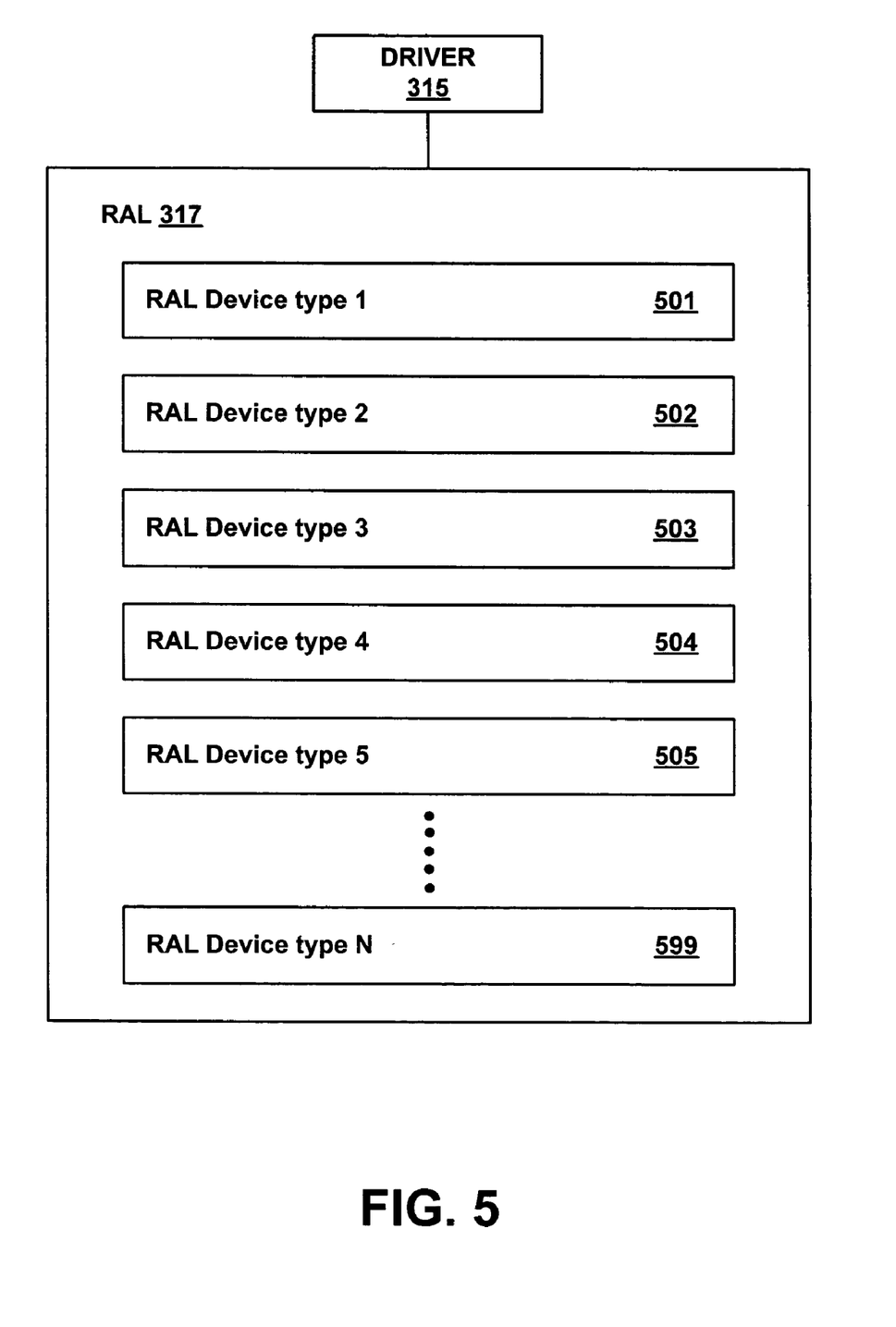
FIG. 5 depicts a RAL for automating the provisioning of a plurality of VPN devices, according to one embodiment of the present invention.

FIG. 5 illustrates that RAL 317, coupled to driver 315, can be comprised of a plurality of RAL functionalities, each specific to a particular VPN device type, for instance, from various vendors. RAL functionality 501 corresponds to a device specific to a first type of VPN, such as a "Vendor 1" VPN. RAL functionality 502 corresponds to a device specific to a second type of VPN, such as a "Vendor 2" VPN. RAL functionality 503 corresponds to a device specific to a third type of VPN, such as a "Vendor 3" VPN.

Similarly, RAL functionality 504 corresponds to a device specific to a fourth type of VPN, RAL functionality 501 corresponds to a device specific to a fifth type of VPN, and RAL functionality 599 corresponds to a device specific to an Nth type of VPN. Any number of RAL functionalities can be provided for any corresponding number of VPN devices. A UDC (e.g., UDC 115; FIGS. 1, 2) can contain all of these RALs. The RALs therein can be periodically updated to accommodate existing, new, and developing VPN devices, VPN types, and vendors' products. Driver 315 can be updated as necessary, also.

Automated VPN provisioning is accomplished using a uniform interface (e.g., logical device configurer 315) and device-specific RAL 317. In one embodiment, RAL 317 is an API for automating a process for configuring the VPN. Uniform interface 315 includes the configuration that determines commands sent to VPN device 109 via the VPN console 377, and to database 301.

A snapshot is taken (e.g., all configuration and wiring settings are recorded) of everything relating to the VPN and its device 109. The 'VPN configuration information' 405 of that snapshot is then pushed back onto database 301. A copy is thus stored which can assist in recovery following failure, in duplication, and in scaling. Other devices relating to the farm being created are then similarly configured.

VPN RAL 317 is based in one embodiment upon a utility computing infrastructure (e.g., utility controller 201; FIGS. 2, 3), where related hardware is wired once. A controlling software layer (e.g., event controller 203) receives requests for VPN resources and communicates with the physical VPN device 109 to make configuration changes thereto. This enables a VPN to be dynamically provisioned (or e.g., de-provisioned) by configuring computing resources into a dynamic data center, also known as a farm.

VPN power is connected to an automated power controller port (e.g., power up port 413). Network connections are programmed into switches and define attributes of a VPN, which can be stored in a repository of the utility computing infrastructure. VPN RAL 317 is, in one embodiment, an API that abstracts this information, connects to the serial console 377 of VPN device 109, and sends device-specific commands thereto to configure the VPN.

Uniform interface 315 defines a standard API, event navigation classes, and a database structure to represent the VPN. A configuration is defined to facilitate these standard structures, comprising basic requirements to provision a secure remote access connection with the IPSec protocol using an Internet Key Exchange.

Event classes are described herein by 'allocate VPN' 404, 'wire VPN' 402, and 'VPN standby' 422, 'VPN update' 432, and 'VPN delete' 442. These event classes are not device specific. Advantageously, development efforts exerted to add subsequent hardware models as device 109 can focus on the creation of a new RAL driver (e.g., 'N+1', etc. in the context of FIG. 5). Thus, the existing GUI and screen resources, database, and event class structure of the event architecture 400 can be re-used.

The driver layer 315 class extracts data needed by RAL 317. Such RAL 317 needed data can include accessing device 109 attributes from repository 301 (FIGS. 2, 3), powering on device 109, and connecting to CLI (or e.g., API) console 377. RAL 317 communicates with device 109 via a serial interface 487 and at CLI 377 makes device-specific configuration changes.

Advantageously, the physical wiring conventionally associated with VPN devices is eliminated. Further, laborious, tedious, expensive, and error-prone manual configuration of such devices, conventionally needed for provisioning a farm since each VPN implements its CLI uniquely, is also effectively eliminated.

In response to event controller 203 calling a 'standby' function 421, a 'VPN standby' functionality 422 exerts an 'unwire' call 423 to device driver 313. This causes device driver to store all information relating to the VPN and disconnect that VPN from the network. This effectively places the VPN in a standby mode. In standby, the VPN is still allocated and/or configured, ready for connection to the network. In this mode, the VPN is still available for re-activation; it is effectively held in reserve. It cannot be allocated for further and/or future use while in standby mode.

In response to event controller 203 calling an 'update' function 431, a 'VPN update' functionality 432 exerts an 'update configuration' call 433 to device driver 313. Responsively, device driver 413 can reconfigure device 109, such as moving it from one subnet to another, for example. In response to event controller 203 calling a 'delete' function 441, a 'VPN delete' functionality 442 exerts an 'erase configuration' call 433 to device driver 313. Responsively, device driver 313 effectively clears the existing configuration of device 109.

In one embodiment, event architecture and command structure 400 comprises software elements that are packaged as a computer usable medium having a computer readable program code embodied therein for causing a computer system to perform a method for automatically deploying a VPN.

These computer-readable and computer-executable instructions reside, for example, in data storage features, memory, registers and other components of a computer system such as utility controller computer 201. For example, event controller 203 deploys the computer-readable and computer-executable instructions, in one embodiment. However, the computer readable and computer executable instructions may reside in any type of computer readable medium anywhere within a system for automatically deploying a VPN.

Exemplary Processes

FIG. 6 depicts a flowchart of the steps in a process 600 for configuring a VPN device, in accordance with one embodiment of the present invention. Process 600 can be performed by a system for automatically configuring a VPN, such as system 100 (FIG. 1). Process 600 begins with step 601, wherein the firmware of a device comprising the VPN is initialized.

In step 602, the device is booted. In step 603, a host name is added. In step 604, network monitoring by the VPN device is automated.

In step 605, the network interfaces are configured on the VPN private IP. In step 606, the network interfaces are configured on the VPN public IP.

In step 607, the network interfaces are configured on the Internet gateway (or the gateway of another network).

In step 608, the remote secure private VPN tunnel, in one embodiment an IPSec configuration, is created through the public networking backbone.

In step 609, copies of the VPN configuration are stored in a repository within the utility computing infrastructure, completing process 600.

FIG. 7 depicts a flowchart of the steps in a process 700 for automatically configuring a VPN device, in accordance with one embodiment of the present invention. Process 700 can be performed by a components (e.g., device driver 313; FIGS. 3, 4) of system for automatically configuring a VPN, such as system 100 (FIG. 1).

Process 700 begins with step 701, wherein a configurer/device driver (e.g., configurer/device driver 313; FIGS. 3, 4) is activated. In one embodiment, the configurer/device driver is activated by an activator component of an event controller (e.g., activator 303, event controller 203; FIGS. 3, 4).

In response to the activation, in step 702, wiring information obtained relating to the designated subnet is automatically pushed onto the VPN device, for instance by a logical device configurer (e.g., configurer 315; FIGS. 3, 4). This configures the VPN device with an IP address and mask, a public interface, and a user, added to configure an IPSec tunnel.

In step 703, the VPN device is automatically configured with device-specific information by a RAL comprising the configurer/device driver. In step 704, the VPN device is automatically configured with non-device specific information by a uniform interface comprising the configurer/device driver, completing process 700.

FIG. 8 depicts a flowchart of the steps in a process 800 for automatically provisioning a farm, in accordance with one embodiment of the present invention. Process 800 can be performed by a components (e.g., event controller 203; FIGS. 2, 3, 4) of system for automatically provisioning a VPN.

Process 800 begins with step 801, wherein a request is received by a utility controller (e.g., utility controller 201; FIGS. 2, 3) to create a VPN. In response to this request, in step 802, the event controller allocates a device to provision the farm for the requested VPN.

In step 803, wiring is performed (e.g., a subnet is assigned) for the allocated device. This can involve obtaining wiring information from a database. In step 804, a configurer/device driver is activated.

In response to the activation, in step 805, the wiring information relating to the designated subnet is automatically pushed onto the VPN device. This can involve configuring the VPN device with an IP address and mask, a public interface, and a user, added to configure an IPSec tunnel.

In step 806, the VPN device is automatically configured with device-specific information by a RAL comprising the configurer/device driver.

In step 807, the VPN device is automatically configured with non-device-specific information by a uniform interface comprising the configurer/device driver.

In step 808, the wiring and configuration information relating to the VPN device is recoded, as by taking a snapshot, and the snapshot is archived in a repository, completing process 800.

In summary, an embodiment of the present invention effectuates the automatic configuration of a VPN. In one embodiment, this effectuates an automated method of deploying a VPN in order to provide secure remote access to a dynamically provisioned data center.

A VPN RAL is based in one embodiment upon a utility computing infrastructure, where related hardware is wired once. A controlling software layer receives requests for VPN resources and communicates with the physical VPN device to make configuration changes thereto. This enables a VPN to be dynamically provisioned (or e.g., de-provisioned) by configuring computing resources into a dynamic data center, known as a farm.

VPN power is connected to an automated power controller port. Network connections are programmed into switches and define attributes of a VPN, which can be stored in a repository of the utility computing infrastructure. The VPN RAL in one embodiment is an API that abstracts this information, connects to a serial console of the VPN device, and sends device-specific commands thereto to configure the VPN.

A uniform interface defines a standard API, event navigation classes, and a database structure to represent the VPN. A configuration is defined to facilitate these standard structures, comprising basic requirements to provision a secure remote access connection with the IPSec protocol using an Internet Key Exchange.

Event classes provide allocation, wiring, and other capabilities. These event classes are not device specific. Advantageously, development efforts exerted to add subsequent hardware models as device can focus on the creation of a new RAL driver. Thus, existing API, database, and event class structure of the event architecture can be re-used.

The driver layer class extracts data needed by the VPN RAL. Such RAL needed data can include accessing device attributes from a repository, powering on the device, and connecting to its CLI console. The RAL communicates with the device via a serial interface and at the CLI makes device-specific configuration changes.

An embodiment of the present invention, a method for automatically deploying a VPN, is thus described. While the present invention has been described in particular embodiments, the present invention should not be construed as limited by such embodiments, but rather construed according to the following claims and their equivalents.

What is claimed is:

1. In a network environment, a system for automatically deploying a Virtual Private Network (VPN) device, comprising:

a utility controller wired only once with a resource pool of one or more VPN devices, said utility controller for receiving a request for said VPN device of said one or more VPN devices to be part of a dynamic data center of VPN devices, and communicating with said VPN device to make configuration changes thereto to enable deployment of said VPN device into said dynamic data center, said communicating performed without requiring individual wiring from said utility controller to each of said one or more VPN devices, wherein said utility controller comprises:
  a resource abstraction layer (RAL) coupled to said VPN device within said resource pool, for automatically providing said VPN device with a configuration specific to said VPN device through a Command Line Interface (CLI) of said VPN device, and wherein said RAL comprises an interpreter for said CLI;
  a uniform interface coupled to said RAL, for automatically providing said VPN device with a configuration that is not specific to said VPN device through said CLI;
  a feature set determiner coupled with said uniform interface, said feature set determiner configured for automatically providing a configuration to said VPN device that is based on feature sets common to said one or more VPN devices, there-by enabling re-use of a feature of said feature sets; and
  a terminal transfer server coupled with said resource pool, said terminal transfer server for transferring configuration commands from said utility controller to said VPN device within said resource pool, to enable said configuration changes to be made thereto before deployment into said dynamic data center.

2. The system as recited in claim 1 wherein said RAL is coupled to a console comprising said VPN device.

3. The system as recited in claim 2 wherein said console comprises a feature selected from the group consisting essentially of said CLI and an Application Program Interface (API).

4. The system as recited in claim 1, further comprising an event controller, wherein said event controller comprises said uniform interface and said RAL.

5. The system as recited in claim 4 wherein said event controller further comprises:
  a database for storing information relating to said VPN device;
  a plurality of logical database access classes coupled to said database, for accessing said database;
  an allocator coupled to said plurality of logical database access classes, for allocating said VPN device;
  a wirer coupled to said plurality of logical database access classes, for connecting said VPN device into said network environment; and
  an activator, coupled selectively to said allocator and to said uniform interface and said RAL, for activating said uniform interface and said RAL.

6. The system as recited in claim 5, further comprising:
  an unwirer coupled to said plurality of logical database access classes, for placing said VPN device in a standby mode;
  an updater coupled to said plurality of logical database access classes, for updating said plurality of logical database access classes with information relating to said VPN device; and
  an eraser coupled to said plurality of logical database access classes, for de-configuring said VPN device.

7. The system as recited in claim 1, wherein said configuration specific to said device comprises a command selected from the group consisting essentially of:
  initializing a firmware resource comprising said VPN device;
  booting said VPN device;
  adding a host name to said VPN device;
  configuring a network interface comprising said VPN device; and
  storing a copy of said configuration specific to said VPN device and said configuration that is not specific to said VPN device.

8. The system as recited in claim 7, wherein said network interface comprises an Internet Protocol (IP).

9. The system as recited in claim 8, wherein said IP comprises an IP selected from the group consisting essentially of a public IP, network gateway IP, and a private IP.

10. The system as recited in claim 8 wherein said private IP comprises a protocol selected from the group consisting essentially of Secure Internet Protocol (IPSec) and Secure Socket Layer (SSL).

11. The system as recited in claim 9, wherein said private IP configures a VPN tunnel.

12. The system as recited in claim 1, wherein said configuration not specific to said VPN device comprises a command selected from the group consisting essentially of:
  access console;
  get information;
  power on; and
  logical configuration.

13. In a provisionable data network, an automated method of deploying a VPN device comprising a Virtual Private Network (VPN), comprising:
  receiving a request for said deploying said VPN device into a dynamic data center;
  in response to said receiving, automatically activating a device driver within a utility controller wired only once with a resource pool of one or more VPN devices comprising said VPN;
  in response to said activating, automatically configuring said VPN device by a uniform interface coupled to a resource abstraction layer with a configuration not specific to said device, said automatically configuring performed without requiring individual wiring from said utility controller to each of said one or more VPN devices, whereby said automatically configuring said device by said uniform interface comprises:
    transferring configuration commands from said uniform interface to said VPN device within said resource pool;
    automatically configuring said VPN device by a feature set determiner coupled to said uniform interface with a configuration that is based on feature sets common to each of said one or more VPN devices, there-by enabling re-use of a feature of said feature sets; and
  further in response to said activating, automatically configuring said VPN device by said resource abstraction layer with a configuration specific to said VPN device through a Command Line Interface (CLI) of said VPN device, said automatically configuring performed without requiring individual wiring from said utility controller to each of said one or more VPN devices, whereby said automatically configuring said device by said resource abstraction layer comprises:
    transferring configuration commands from said resource abstraction layer to said VPN device within said resource pool via a terminal transfer server, to enable configuration changes to be made thereto before deployment into said dynamic data center.

14. The automated method as recited in claim 13, wherein said configuration not specific to said VPN device comprises a command selected from the group consisting essentially of:
- access console;
- get information;
- power on; and
- logical configuration.

15. The automated method as recited in claim 13, wherein said configuration specific to said VPN device comprises a command causing an action selected from the group consisting essentially of:
- initializing a firmware resource comprising said VPN device;
- booting said VPN device;
- adding a host name to said VPN device;
- configuring a network interface comprising said VPN device; and
- storing a copy of said configuration specific to said VPN device and said configuration that is not specific to said VPN device.

16. The method as recited in claim 15 wherein said network interface comprises an Internet Protocol (IP).

17. The method as recited in claim 16, wherein said IP comprises an IP selected from the group consisting essentially of a public IP, network gateway IP, and a private IP.

18. The method as recited in claim 17 wherein said private IP comprises a protocol selected from the group consisting essentially of Secure Internet Protocol (IPSec) and Secure Socket Layer (SSL).

19. The method as recited in claim 17, wherein said private IP configures a VPN tunnel.

20. The method as recited in claim 13, further comprising:
- allocating said VPN; and
- wiring said VPN.

21. The method as recited in claim 12, further comprising:
- placing said VPN in a standby mode;
- updating said configuration not specific to said VPN device and said configuration specific to said VPN device; and
- deleting said VPN.

22. In a computer system of a provisionable data network, a computer usable medium having a computer readable program code embodied therein for causing said computer system to perform an automated method for deploying a VPN device comprising a Virtual Private Network (VPN), said method comprising:
- in response to receiving a request for deploying said VPN device into a dynamic data center, automatically activating a device driver within a utility controller wired only once with a resource pool of one or more VPN devices comprising said VPN;
- in response to said activating, automatically configuring said VPN device by a uniform interface coupled to a resource abstraction layer with a configuration not specific to said device, said automatically configuring said VPN device by a uniform interface coupled to a resource abstraction layer performed without requiring individual wiring from said utility controller to each of said one or more VPN devices, whereby said automatically configuring said VPN device by said uniform interface comprises:
  - transferring configuration commands from said uniform interface to said VPN device within said resource pool;
- automatically configuring said VPN device by a feature set determiner coupled to said uniform interface with a configuration that is based on feature sets common to each of said one or more VPN devices, there-by enabling re-use of a feature of said feature sets; and
- further in response to said activating, automatically configuring said VPN device by said resource abstraction layer with a configuration specific to said VPN device through a Command Line Interface (CLI) of said VPN device, said automatically configuring said VPN device by said resource abstraction layer performed without requiring individual wiring from said utility controller to each of said one or more VPN devices, whereby said automatically configuring said VPN device by said resource abstraction layer comprises:
  - transferring configuration commands from said resource abstraction layer to said VPN device within said resource pool.

23. The computer usable medium as recited in claim 22, wherein said configuration not specific to said VPN device comprises a command selected from the group consisting essentially of:
- access console;
- get information;
- power on; and
- logical configuration.

24. The computer usable medium as recited in claim 22, wherein said configuration specific to said VPN device comprises a command causing an action selected from the group consisting essentially of:
- initializing a firmware resource comprising said VPN device;
- booting said VPN device;
- adding a host name to said VPN device;
- configuring a network interface comprising said VPN device; and
- storing a copy of said configuration specific to said VPN device and said configuration that is not specific to said VPN device.

25. The computer usable medium as recited in claim 24 wherein said network interface comprises an Internet Protocol (IP).

26. The computer usable medium as recited in claim 25, wherein said IP comprises an IP selected from the group consisting essentially of a public IP, network gateway IP, and a private IP.

27. The computer usable medium as recited in claim 26 wherein said private IP comprises a protocol selected from the group consisting essentially of Secure Internet Protocol (IPSec) and Secure Socket Layer (SSL).

28. The computer usable medium as recited in claim 26, wherein said private IP configures a VPN tunnel.

29. The computer usable medium as recited in claim 22, wherein said method further comprises:
- allocating said VPN; and
- wiring said VPN.

30. The computer usable medium as recited in claim 22, wherein said method further comprises:
- placing said VPN in a standby mode;
- updating said configuration not specific to said VPN device and said configuration specific to said VPN device; and
- deleting said VPN.

* * * * *